(12) United States Patent
V et al.

(10) Patent No.: US 9,558,457 B2
(45) Date of Patent: Jan. 31, 2017

(54) METHOD AND SYSTEM FOR AUTOMATICALLY IDENTIFYING OPTIMAL MEETING LOCATIONS

(75) Inventors: Deepak Kumar V, Bangalore (IN); Subramaniam Venkatraman Krishnan, Bangalore (IN); Ashvin Agrawal, Bangalore (IN)

(73) Assignee: EXCALIBUR IP, LLC, Sunnyvale, CA (US)

( * ) Notice: Subject to any disclaimer, the term of this patent is extended or adjusted under 35 U.S.C. 154(b) by 377 days.

(21) Appl. No.: 13/190,502

(22) Filed: Jul. 26, 2011

(65) Prior Publication Data

US 2013/0031013 A1 Jan. 31, 2013

(51) Int. Cl.
*G06Q 30/02* (2012.01)
*G06Q 10/10* (2012.01)
*G06Q 10/06* (2012.01)
*G06Q 40/02* (2012.01)
*G06Q 99/00* (2006.01)
*G06Q 10/02* (2012.01)
*G06Q 10/04* (2012.01)
*G06Q 50/00* (2012.01)

(52) U.S. Cl.
CPC .............. *G06Q 10/02* (2013.01); *G06Q 10/04* (2013.01); *G06Q 50/01* (2013.01)

(58) Field of Classification Search
CPC ....................................................... G06Q 50/01
USPC ................................................. 705/1.1–912
See application file for complete search history.

(56) References Cited

U.S. PATENT DOCUMENTS

| 2007/0282661 | A1* | 12/2007 | Franco | 705/9 |
| 2009/0055238 | A1* | 2/2009 | Baryshnikov et al. | 705/8 |
| 2012/0191501 | A1* | 7/2012 | Olliphant | 705/7.19 |

* cited by examiner

*Primary Examiner* — Jonathan Ouellette
(74) *Attorney, Agent, or Firm* — James J. DeCarlo; Greenberg Traurig

(57) ABSTRACT

A method and system for automatically identifying optimal meeting locations. The method includes receiving a plurality of meeting parameters associated with one or more participants. The method also includes identifying a list of optimal meeting locations relevant to one or more of the plurality of meeting parameters. The method further includes ranking the list of optimal meeting locations. Further, the method includes enabling a user to select an optimal meeting location from the list of optimal meeting locations. The system includes one or more electronic devices and a user electronic device. The user electronic device includes a communication interface, a memory, and a processor.

18 Claims, 3 Drawing Sheets

METHOD AND SYSTEM FOR AUTOMATICALLY IDENTIFYING OPTIMAL MEETING LOCATIONS

TECHNICAL FIELD

Embodiments of the disclosure relate to the field of automatically identifying optimal meeting locations.

BACKGROUND

Meetings, for example formal meetings and social gatherings, are currently scheduled with respect to convenience of a meeting organizer. Existing systems for providing meeting location suggestions are based on location of the meeting organizer. However, the location is often is not convenient for a majority of invited participants. Further, one or more of the meeting location suggestions are not applicable for some of the invited participants. For example, party location suggestions are not legally permissible for a certain age group of teenagers. Moreover, the meeting organizer has to conduct a detailed search before selecting a desired meeting location. Such a detailed search is both tedious and time-consuming.

In the light of the foregoing discussion, there is a need for a method and system for an efficient technique to automatically identifying optimal meeting locations.

SUMMARY

The above-mentioned needs are met by a method, a computer program product and a system for automatically identifying optimal meeting locations.

An example of a method of automatically identifying optimal meeting locations includes receiving a plurality of meeting parameters associated with one or more participants. The method also includes identifying a list of optimal meeting locations relevant to one or more of the plurality of meeting parameters. The method further includes ranking the list of optimal meeting locations. Further, the method includes enabling a user to select an optimal meeting location from the list of optimal meeting locations.

An example of a computer program product stored on a non-transitory computer-readable medium that when executed by a processor, performs a method of automatically identifying optimal meeting locations includes receiving a plurality of meeting parameters associated with one or more participants. The computer program product also includes identifying a list of optimal meeting locations relevant to one or more of the plurality of meeting parameters. The computer program product further includes ranking the list of optimal meeting locations. Further, the computer program product includes enabling a user to select an optimal meeting location from the list of optimal meeting locations.

An example of a system for automatically identifying optimal meeting locations includes one or more electronic devices and a user electronic device. The user electronic device includes a communication interface in electronic communication with the one or more electronic devices. The user electronic device also includes a memory that stores instructions. The user electronic device further includes a processor responsive to the instructions to receive a plurality of meeting parameters associated with one or more participants. The processor is also responsive to the instructions to identify a list of optimal meeting locations relevant to one or more of the plurality of meeting parameters. The processor is further responsive to the instructions to rank the list of optimal meeting locations. Further, the processor is responsive to the instructions to enable a user to select an optimal meeting location from the list of optimal meeting locations.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

The above-mentioned needs are met by a method, computer program product and system for automatically identifying optimal meeting locations. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
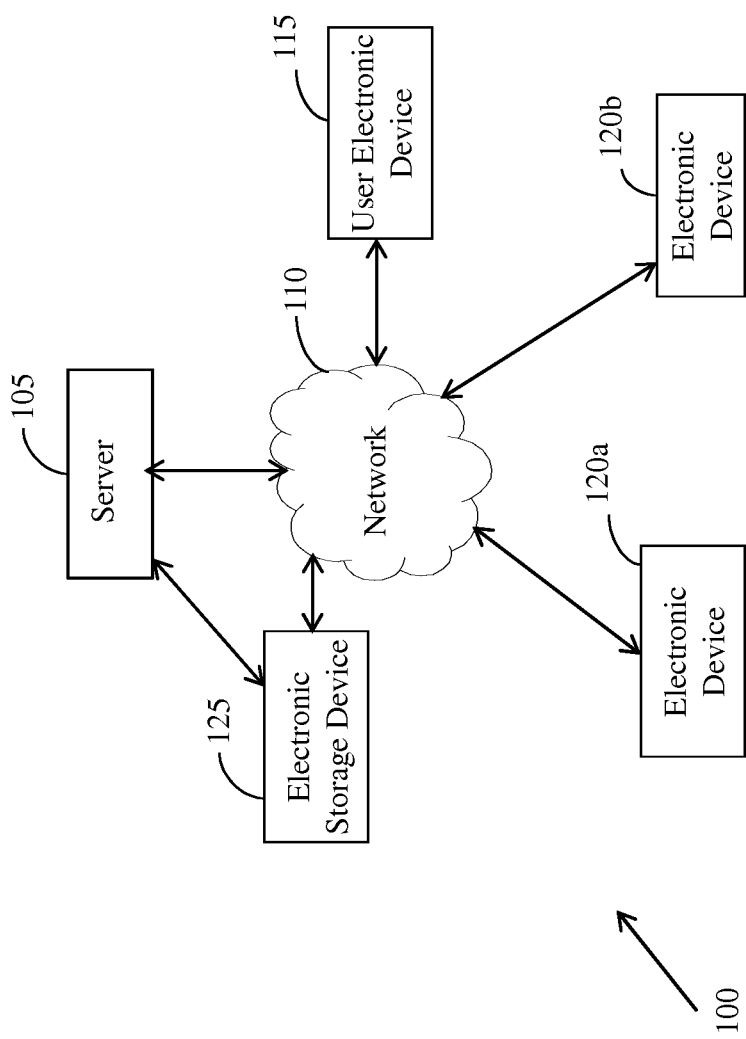
FIG. 1 is a block diagram of an environment, in accordance with which various embodiments can be implemented.

FIG. 1 is a block diagram of an environment 100, in accordance with which various embodiments can be implemented.

The environment 100 includes a server 105 connected to a network 110. The environment 100 also includes a user electronic device 115 connected to the network 110. The environment 100 further includes one or more electronic devices, for example an electronic device 120a and an electronic device 120b, which can communicate with the user electronic device 115 through the network 110. Examples of the user electronic device 115 and the electronic devices include, but are not limited to, computers, mobile devices, laptops, palmtops, hand held devices, telecommunication devices, and personal digital assistants (PDAs). The user electronic device 115 and the electronic devices are location-aware devices that can be defined as devices that can actively or passively determine its location. The location can be determined using global positioning system (GPS), assisted GPS (AGPS), internet protocol (IP) address based location determination, and intranet.

The user electronic device 115 of a user can communicate with the server 105 through the network 110. Examples of the network 110 include, but are not limited to, a Local Area Network (LAN), a Wireless Local Area Network (WLAN), a Wide Area Network (WAN), internet, and a Small Area Network (SAN). The electronic devices associated with one or more participants can be remotely located with respect to the server 105.

The server 105 is also connected to an electronic storage device 120 directly or via the network 110 to store information, for example participant profiles associated with the participants and a plurality of business listings associated with a plurality of meeting locations. The list of optimal meeting locations is identified from the meeting locations.

In some embodiments, different electronic storage devices are used for storing the information.

A user of a user electronic device, for example the user electronic device 115, can enter names of one or more participants and a meeting objective via an application on the user electronic device. The participant profiles of the one or more participants are retrieved from a server, for example a Yahoo!® server, and a list of optimal meeting locations are identified from a plurality of meeting locations associated with a plurality of business listings that are stored in the server. The list of optimal meeting locations is subsequently ranked and displayed to the user. The user can then select an optimal meeting location from the list of optimal meeting locations. Further, the user can send invites, via the network 110, to the electronic devices, for example the electronic device 120*a* and the electronic device 120*b*, of the one or more participants.

Figure 2:
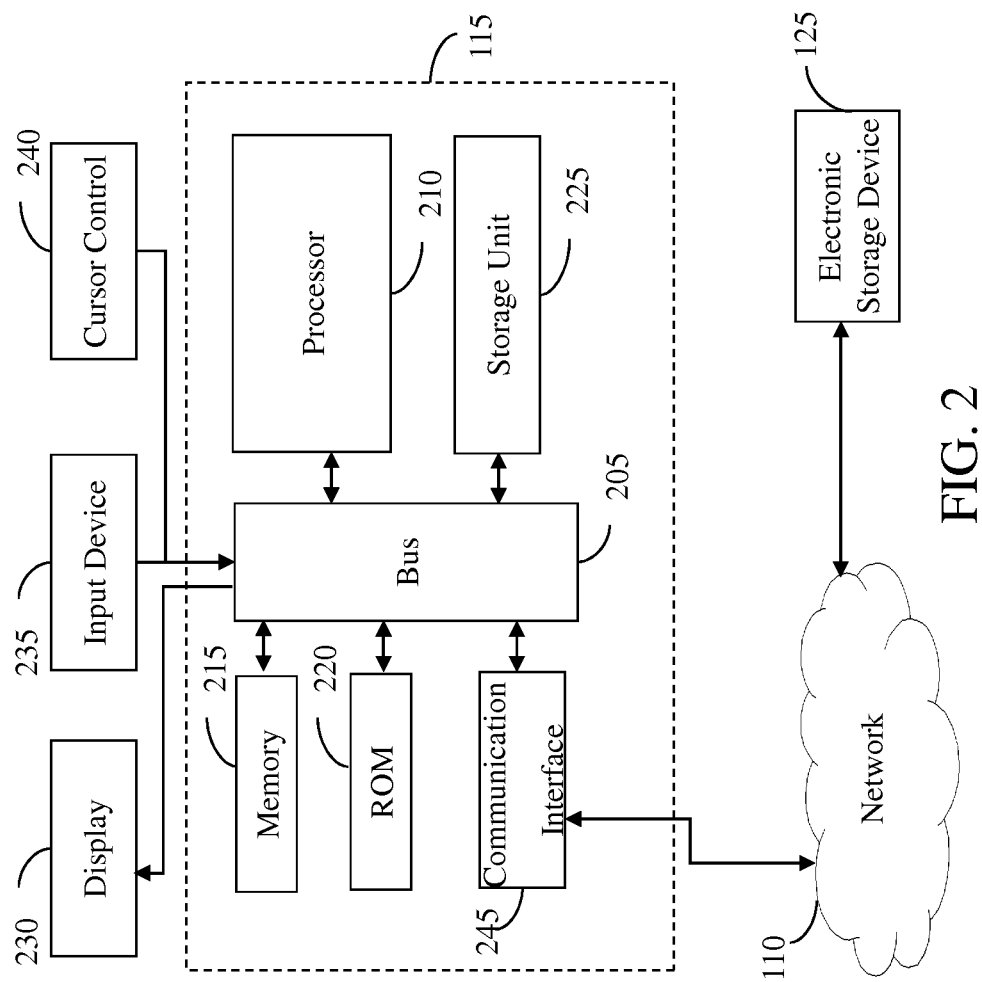
FIG. 2 is a block diagram of a user electronic device, in accordance with one embodiment.

The user electronic device 115 including a plurality of elements is explained in detail in conjunction with FIG. 2.

FIG. 2 is a block diagram of the user electronic device 115, in accordance with one embodiment.

The user electronic device 115 includes a bus 205 or other communication mechanism for communicating information, and a processor 210 coupled with the bus 205 for processing information. The user electronic device 115 also includes a memory 215, for example a random access memory (RAM) or other dynamic storage device, coupled to the bus 205 for storing information and instructions to be executed by the processor 210. The memory 215 can be used for storing temporary variables or other intermediate information during execution of instructions by the processor 210. The user electronic device 115 further includes a read only memory (ROM) 220 or other static storage device coupled to the bus 205 for storing static information and instructions for the processor 210. A storage unit 225, for example a magnetic disk or optical disk, is provided and coupled to the bus 205 for storing information, for example information associated with a plurality of meeting parameters, and a list of optimal meeting locations.

The user electronic device 115 can be coupled via the bus 205 to a display 230, for example a cathode ray tube (CRT), and liquid crystal display (LCD) for displaying a list of optimal meeting locations to the user. An input device 235, including alphanumeric and other keys, is coupled to bus 205 for communicating information and command selections to the processor 210. Another type of user input device is a cursor control 240, for example a mouse, a trackball, or cursor direction keys for communicating direction information and command selections to the processor 210 and for controlling cursor movement on the display 230. The input device 235 can also be included in the display 230, for example a touch screen.

Various embodiments are related to the use of the user electronic device 115 for implementing the techniques described herein. In some embodiments, the techniques are performed by the user electronic device 115 in response to the processor 210 executing instructions included in the memory 215. Such instructions can be read into the memory 215 from another machine-readable medium, for example the storage unit 225. Execution of the instructions included in the memory 215 causes the processor 210 to perform the process steps described herein.

In some embodiments, the processor 210 can include one or more processing units for performing one or more functions of the processor 210. The processing units are hardware circuitry used in place of or in combination with software instructions to perform specified functions.

The term "machine-readable medium" as used herein refers to any medium that participates in providing data that causes a machine to perform a specific function. In an embodiment implemented using the user electronic device 115, various machine-readable media are involved, for example, in providing instructions to the processor 210 for execution. The machine-readable medium can be a storage medium, either volatile or non-volatile. A volatile medium includes, for example, dynamic memory, such as the memory 215. A non-volatile medium includes, for example, optical or magnetic disks, for example the storage unit 225. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, any other optical media, punchcards, papertape, any other physical media with patterns of holes, a RAM, a PROM, and EPROM, a FLASH-EPROM, any other memory chip or cartridge.

In another embodiment, the machine-readable media can be transmission media including coaxial cables, copper wire and fiber optics, including the wires that comprise the bus 205. Transmission media can also take the form of acoustic or light waves, such as those generated during radio-wave and infra-red data communications. Examples of machine-readable media may include, but are not limited to, a carrier wave as described hereinafter or any other media from which the user electronic device 115 can read, for example online software, download links, installation links, and online links. For example, the instructions can initially be carried on a magnetic disk of a remote computer. The remote computer can load the instructions into its dynamic memory and send the instructions over a telephone line using a modem. A modem local to the user electronic device 115 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the storage unit 225 either before or after execution by the processor 210. All such media must be tangible to enable the instructions carried by the media to be detected by a physical mechanism that reads the instructions into a machine.

The user electronic device 115 also includes a communication interface 245 coupled to the bus 205. The communication interface 245 provides a two-way data communication coupling to the network 110. For example, the communication interface 245 can be an integrated services digital network (ISDN) card or a modem to provide a data communication connection to a corresponding type of telephone line. As another example, the communication interface 245 can be a local area network (LAN) card to provide a data communication connection to a compatible LAN.

Wireless links can also be implemented. In any such implementation, the communication interface 245 sends and receives electrical, electromagnetic or optical signals that carry digital data streams representing various types of information.

The user electronic device 115 is also connected to the electronic storage device 120 to store the participant profiles associated with the participants and a plurality of business listings associated with a plurality of meeting locations. The list of optimal meeting locations is identified from the meeting locations.

The processor 210 in the user electronic device 115 receives identifiers of one or more participants and a meeting objective from the user via an application. The processor 210 retrieves participant profiles of the participants from a server, for example a Yahoo!® server. The processor 210 further identifies a list of optimal meeting locations that are relevant to one or more of the meeting parameters. The processor 210 ranks the list of optimal meeting locations to be displayed to the user via the user electronic device 115. The user can then select an optimal meeting location from the list of optimal meeting locations. The user can further send invites to the one or more participants and perform other related functions using the user electronic device 115.

Figure 3:
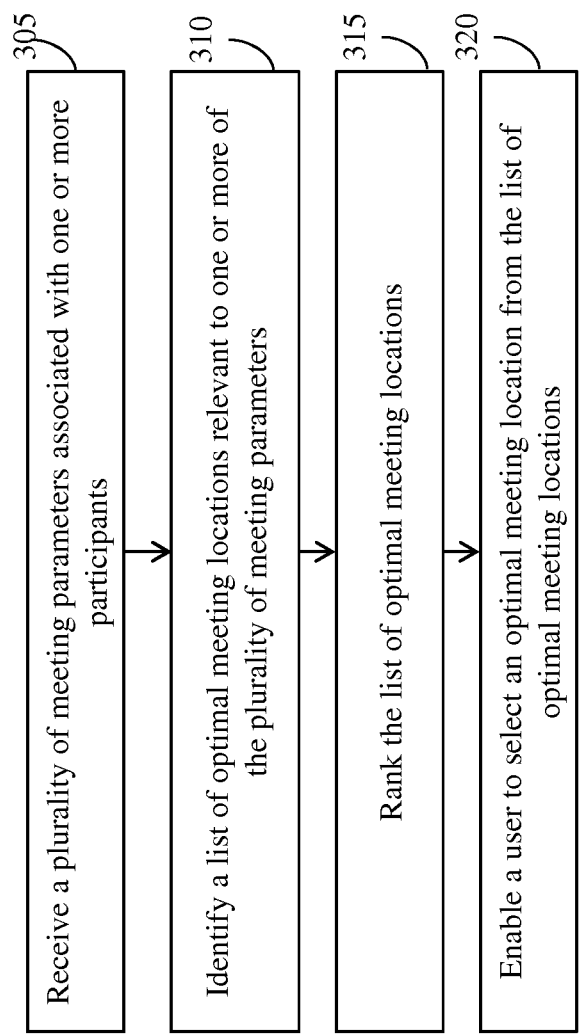
FIG. 3 is a flowchart illustrating a method of automatically identifying optimal meeting locations, in accordance with one embodiment.

FIG. 3 is a flowchart illustrating a method of automatically identifying optimal meeting locations, in accordance with one embodiment.

In one example, the method is performed using an application that is downloadable and resides on a user electronic device, for example the user electronic device 115. Examples of the application include, but are not limited to, an android application, an iphone application, and a personal computer application.

In another example, the method can be performed using a website, an email application, or application programming interface (API) calls.

At step 305, a plurality of meeting parameters associated with one or more participants is received. The meeting parameters are received by the user electronic device of a user. The meeting parameters include identifiers, participant profiles, and a meeting objective. Examples of the identifiers include, but are not limited to, names, electronic mail identifiers, image identifiers, and phone numbers. A participant profile includes profile information of a participant. Examples of the profile information of the participant include, but are not limited to, age, one or more interests, preferences, provenance, location, history, and mode of transport. The location of the participant can be one of an assigned location and a current location. Examples of the meeting objective include, but are not limited to, dinner, movie, a sporting event, and an official discussion.

The identifiers and the meeting objective are provided by the user to the user electronic device, for example the user electronic device 115, via the application. In some embodiments, the identifiers and the meeting objective can be provided using a tool or a command. The participant profiles are stored at a server, for example the server 105, and are retrieved as required. In one example, the server can be a centralized server or a distributed server of Yahoo!®.

At step 310, a list of optimal meeting locations relevant to one or more of the meeting parameters is identified. The list of optimal meeting locations is identified by performing one or more steps of estimating a cost factor for each meeting location in a plurality of meeting locations, checking eligibility of each meeting location, identifying one or more deals in vicinity of each meeting location, calculating an average distance from a centroidal location associated with the one or more participants to each meeting location, determining if the interests of each participant match each meeting location, and detecting a meeting history of each meeting location.

In some embodiments, the cost factor can be estimated based on travel time, weather conditions, and traffic conditions.

The meeting locations are associated with a plurality of business listings that are stored in the server, for example the server 105. The list of optimal meeting locations is identified from the meeting locations. Each business listing includes, but is not limited to, a geographical location, a category, deals, age restrictions, timings, rules, and regulations. Examples of the category include, but are not limited to, entertainment, travel, education, real estate, and hotels.

Examples of the eligibility of each meeting location include, but are not limited to, entry restrictions for males or females, age group entry restrictions, and entry restrictions for stags.

In some embodiments, the list of optimal meeting locations can be identified using a search algorithm.

At step 315, the list of optimal meeting locations is ranked. Each optimal meeting location in the list of optimal meeting locations is ranked based on the cost factor, the eligibility, the deals, the average distance, the interests, and the meeting history. In one example, an optimal meeting location in the list of optimal meeting locations can be ranked first if the cost factor of the optimal meeting location is within a particular budget, if the participants are eligible to enter the optimal meeting location, if a sale or a discount is present in the vicinity of the optimal meeting location, if the average distance from the centroidal location to the optimal meeting location is satisfactory, if some of the interests of each participant match the optimal meeting location, or if some of the participants have previously visited the optimal meeting location. Similarly, other optimal meeting locations in the list of optimal meeting locations are subsequently ranked.

In some embodiments, the list of optimal meeting locations can be ranked using the search algorithm.

The list of optimal meeting locations, which is ranked, is subsequently displayed to the user.

In some embodiments, the list of optimal meeting locations is displayed in extensible markup language (XML) format or in hypertext markup language (HTML) format. The list of optimal meeting locations can also be presented in an application programming interface (API).

At step 320, the user is enabled to select an optimal meeting location from the list of optimal meeting locations as desired.

In some embodiments, the user can then invite the participants to the optimal meeting location by sending one of a short message service (SMS), an electronic mail, and an invite on a social networking site. The participants can also be invited via a phone call.

In some embodiments, the user invites the participants excluded from the list of participants. The one or more participants can be in vicinity of the optimal meeting location.

In other embodiments, the user can be notified if the one or more participants enter the optimal meeting location, the one or more participants being excluded from the list of participants.

In some embodiments, the user can obtain reservations at the optimal meeting location either automatically, by making a phone call, or by sending an electronic mail to a manager. The user can also check reviews and ratings of the meeting location, sometimes provided by the one or more participants, before obtaining the reservations. The user can also obtain the reservations by being directed to a corresponding website via a link.

In some embodiments, the travel time to the optimal meeting location is determined for each participant and can be displayed via maps, for example Yahoo!® maps.

In one example, an employee of Yahoo!®, situated in a first office building, needs to schedule an official meeting with two colleagues, situated at a second office building. As Yahoo!® employs intranet in each of its office buildings, profile information associated with each employee is usually kept updated. Examples of the profile information include, but are not limited to, geographical location, interest groups, and cube number. The employee can enter names of the two colleagues in an email application, for example Microsoft Outlook, via an office computer and provide a meeting objective to create a meeting invite. The server, for example the Yahoo!® server, retrieves the profile information corresponding to the two colleagues. A list of optimal meeting locations that are relevant to the profile information are then identified and ranked. Optimal meeting locations that are available in the second office building can be ranked higher as the two colleagues are situated in the second office building. The employee then selects an optimal meeting location from the list of optimal meeting locations. The employee can further send the meeting invite to the one or more colleagues and perform other related functions.

The present disclosure automatically identifies optimal meeting locations by using available information, for example participant profiles and business listings. Users can save time and hence be motivated to use different technologies, for example Yahoo! technologies, for staying connected, scheduling meeting invites and sending electronic mails. The users are also provided with a list of optimal meeting locations based on local deals and offers. Click revenue is thereby improving as the users can visit locations of the local deals and offers and make a purchase. Revenue is also improved as each business listing can be sponsored.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method comprising:
receiving, at a computing device over a network, a plurality of meeting parameters associated with one or more participants from a set of persons whose participant profiles are stored on a server on the network, the participant profiles including one of an assigned location and a current location of the person;
identifying, by the computing device, from a list of available meeting locations stored in a database on the network, a list of optimal meeting locations relevant to one or more of the plurality of meeting parameters;
ranking, by the computing device, all of the meeting locations within the list of optimal meeting locations into a ranked list based on the meeting parameters;
receiving, at the computing device, a selection from a user of an optimal meeting location from the list of optimal meeting locations;
communicating, via the computing device, an invitation to one or more participants excluded from the list of participants in response to said selection, the one or more participants being determined to be in a vicinity of the optimal meeting location based on one of the excluded participant's assigned location and current location as given in the participant profile; and
notifying the user, via the computing device, based on contact information in the user's participant profile, when one or more of the excluded participants enter the optimal meeting location.

2. The method as claimed in claim 1, wherein the plurality of meeting parameters comprises identifiers, participant profiles, and a meeting objective.

3. The method as claimed in claim 2, wherein the identifiers and the meeting objective are provided by the user through a computer user interface.

4. The method as claimed in claim 1, wherein identifying the list of optimal meeting locations comprises:
estimating a cost factor for each meeting location in a plurality of meeting locations;
checking eligibility of each meeting location;
identifying one or more deals in vicinity of each meeting location;
calculating an average distance from a centroidal location associated with the one or more participants to each meeting location;

determining if one or more interests of each participant match each meeting location; and detecting a meeting history of each meeting location.

5. The method as claimed in claim 2 and further comprising:

storing the participant profiles of the one or more participants; and storing a plurality of business listings associated with a plurality of meeting locations, the list of optimal meeting locations identified from the plurality of meeting locations.

6. The method as claimed in claim 1 and further comprising:

enabling the user to contact a representative of the optimal meeting location, and thereby to obtain reservations at the optimal meeting location.

7. The method as claimed in claim 1 and further comprising:

inviting the list of participants to the optimal meeting location.

8. A non-transitory computer-readable storage medium tangibly encoded with computer-executable instructions, that when executed by a processor associated with a computing device, performs a method comprising:

receiving, over a network, a plurality of meeting parameters associated with one or more participants from a set of persons whose participant profiles are stored on a server on the network, the participant profiles including one of an assigned location and a current location of the person;

identifying a list of optimal meeting locations relevant to one or more of the plurality of meeting parameters from a list of available meeting locations stored in a database on the network;

ranking all of the meeting locations within the list of optimal meeting locations into a ranked list based on the meeting parameters;

receiving a selection from a user of an optimal meeting location from the list of optimal meeting locations;

communicating an invitation to one or more participants excluded from the list of participants in response to the selection, the one or more participants being determined to be in a vicinity of the optimal meeting location based on one of the excluded participant's assigned location and current location as given in the participant profile; and notifying the user, based on contact information in the user's participant profile, when one or more of the excluded participants enter the optimal meeting location.

9. The non-transitory computer-readable storage medium as claimed in claim 8, wherein the plurality of meeting parameters comprises identifiers, participant profiles, and a meeting objective.

10. The non-transitory computer-readable storage medium as claimed in claim 9, wherein the identifiers and the meeting objective are provided by the user.

11. The non-transitory computer-readable storage medium as claimed in claim 8, wherein identifying the list of optimal meeting locations comprises:

estimating a cost factor for each meeting location in a plurality of meeting locations;

checking eligibility of each meeting location;

identifying one or more deals in vicinity of each meeting location;

calculating an average distance from a centroidal location associated with the one or more participants to each meeting location;

determining if one or more interests of each participant match each meeting location; and detecting a meeting history of each meeting location.

12. The non-transitory computer-readable storage medium as claimed in claim 9 and further comprising:

storing the participant profiles of the one or more participants; and storing a plurality of business listings associated with a plurality of meeting locations, the list of optimal meeting locations identified from the plurality of meeting locations.

13. The non-transitory computer-readable storage medium as claimed in claim 8 and further comprising:

enabling the user to contact a representative of the optimal meeting location, and thereby to obtain reservations at the optimal meeting location.

14. The non-transitory computer-readable storage medium as claimed in claim 8 and further comprising:

inviting the list of participants to the optimal meeting location.

15. A system comprising:

a processor;

a non-transitory computer-readable storage medium for tangibly storing thereon program logic for execution by the processor, the program logic comprising:

receiving logic executed by the processor for receiving, over a network, a plurality of meeting parameters associated with one or more participants from a set of persons whose participant profiles are stored on a server on the network, the participant profiles including one of an assigned location and a current location of the person;

identification logic executed by the processor for identifying a list of optimal meeting locations relevant to one or more of the plurality of meeting parameters from a list of available meeting locations stored in a database on the network;

ranking logic executed by the processor for ranking all of the meeting locations within the list of optimal meeting locations into a ranked list based on the meeting parameters;

selection logic executed by the processor for receiving a selection of an optimal meeting location from the list of optimal meeting locations;

invitation logic executed by the processor for communicating an invitation to one or more participants excluded from the list of participants in response to the selection, the one or more participants being determined to be in a vicinity of the optimal meeting location based on one of the excluded participant's assigned location and current location as given in the participant profile; and notification logic executed by the processor for notifying the user, based on contact information in the user's participant profile, when one or more of the excluded participants enter the optimal meeting location.

16. The system as claimed in claim 15, wherein the plurality of meeting parameters comprises identifiers, participant profiles, and a meeting objective.

17. The system as claimed in claim 16 and further comprising:

storage logic executed by the processor for storing the participant profiles associated with the one or more participants and a plurality of business listings associated with a plurality of meeting locations.

18. The system as claimed in claim 15, further comprising:
- estimation logic executed by the processor for estimating a cost factor for each meeting location in a plurality of meeting locations;
- checking logic executed by the processor for checking eligibility of each meeting location;
- identification logic executed by the processor for identifying one or more deals in vicinity of each meeting location;
- calculation logic executed by the processor for calculating an average distance from a centroidal location associated with the one or more participants to each meeting location;
- determination logic executed by the processor for determining if one or more interests of each participant match each meeting location; and
- detection logic executed by the processor for detecting a meeting history of each meeting location.

\* \* \* \* \*